United States Patent
Meunier

(10) Patent No.: US 12,486,023 B2
(45) Date of Patent: Dec. 2, 2025

(54) MODEL-BASED SPEED GOVERNING FOR VARIABLE-PITCH PROPELLER

(71) Applicant: PRATT & WHITNEY CANADA CORP., Longueuil (CA)

(72) Inventor: Gabriel Meunier, Saint-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 148 days.

(21) Appl. No.: 18/408,010

(22) Filed: Jan. 9, 2024

(65) Prior Publication Data

US 2025/0223026 A1   Jul. 10, 2025

(51) Int. Cl.
G06F 17/00   (2019.01)
B64C 11/30   (2006.01)
B64C 11/40   (2006.01)

(52) U.S. Cl.
CPC ............ B64C 11/303 (2013.01); B64C 11/40 (2013.01)

(58) Field of Classification Search
CPC ..... B64C 11/303; B64C 11/40; B64C 11/305; F05D 2260/81; F02C 6/206; F02C 9/58; B64D 31/08
USPC .......................................................... 701/1
See application file for complete search history.

(56) References Cited

U.S. PATENT DOCUMENTS

| | | | |
|---|---|---|---|
| 5,209,640 A | 5/1993 | Moriya | |
| 5,416,699 A | 5/1995 | DiValentin et al. | |
| 7,908,044 B2 * | 3/2011 | Piasecki | B64C 27/82 |
| | | | 701/16 |
| 9,180,976 B2 | 11/2015 | Kobayashi | |
| 9,745,051 B2 | 8/2017 | Tantot | |
| 10,102,312 B2 | 10/2018 | Tantot | |
| 10,625,873 B2 | 4/2020 | Djelassi | |
| 10,961,921 B2 | 3/2021 | Tang | |

(Continued)

FOREIGN PATENT DOCUMENTS

| | | |
|---|---|---|
| CN | 117171994 A | 12/2023 |
| CN | 118296727 A | 7/2024 |

(Continued)

OTHER PUBLICATIONS

Variable Pitch Propeller: Multi-Objective Optimization Design and Performance Analysis (Year: 2024).*

(Continued)

*Primary Examiner* — Ronnie M Mancho
(74) *Attorney, Agent, or Firm* — Norton Rose Fulbright Canada LLP

(57) ABSTRACT

Systems and methods for controlling a variable-pitch propeller of an aircraft are provided. A method for controlling the variable-pitch propeller includes using a feedback controller, operating the variable-pitch propeller at a current operating condition including a current rotational speed, determining a speed error between the current rotational speed of the variable-pitch propeller and a set point rotational speed for the variable-pitch propeller, determining a gain for the feedback controller based on a power coefficient and an advance ratio of the variable-pitch propeller. Using the feedback controller, a propeller pitch command is determined based on the speed error and using the gain. The pitch of the variable-pitch propeller is adjusted according to the propeller pitch command to reduce the speed error.

20 Claims, 10 Drawing Sheets

(56) References Cited

U.S. PATENT DOCUMENTS

| | | | |
|---|---|---|---|
| 11,287,781 B2 | 3/2022 | Castellani | |
| 11,549,448 B2 | 1/2023 | Djelassi | |
| 11,592,791 B1* | 2/2023 | Wiegman | G08G 5/53 |
| 11,604,481 B2* | 3/2023 | Eglin | B64C 27/57 |
| 11,635,032 B2* | 4/2023 | Meunier | B64F 5/60 |
| | | | 701/100 |
| 11,702,943 B2 | 7/2023 | Krzywon | |
| 11,731,757 B2* | 8/2023 | Berger | B64C 27/72 |
| | | | 416/1 |
| 12,037,117 B2* | 7/2024 | Foggia | B64C 27/08 |
| 12,043,398 B2* | 7/2024 | Campbell | B64U 30/297 |
| 12,214,675 B2* | 2/2025 | Wiegman | B64D 27/34 |
| 12,221,008 B2* | 2/2025 | Schreiber | H01M 10/425 |
| 12,332,658 B2* | 6/2025 | Famularo | G05D 1/48 |
| 2021/0180525 A1* | 6/2021 | Meunier | B64C 11/303 |
| 2024/0375767 A1 | 11/2024 | Matko | |
| 2024/0375799 A1* | 11/2024 | Geuther | B64U 50/30 |
| 2024/0409228 A1* | 12/2024 | Herlihy | B64D 1/02 |
| 2025/0223026 A1* | 7/2025 | Meunier | B64C 11/305 |
| 2025/0229890 A1* | 7/2025 | Meunier | B64C 11/303 |

FOREIGN PATENT DOCUMENTS

| | | | | |
|---|---|---|---|---|
| EP | 3670333 | A1 | 6/2020 | |
| EP | 3835199 | B1 | 9/2023 | |
| EP | 4585508 | A1 * | 7/2025 | |
| EP | 4585509 | A1 * | 7/2025 | |
| WO | WO-2023147893 | A1 * | 8/2023 | F03D 3/0463 |
| WO | WO-2024100592 | A1 * | 5/2024 | B64C 29/0033 |
| WO | 2024253782 | A1 | 12/2024 | |

OTHER PUBLICATIONS

European Patent Office, Communication re. extended European search report for European patent application No. 25151064.0, Apr. 3, 2025.

* cited by examiner

FIG. 7A

Values of $K_{J2B}$

FIG. 7B

Values of $K_{CP2B}$

FIG. 7C

Values of $K_{X2B}$

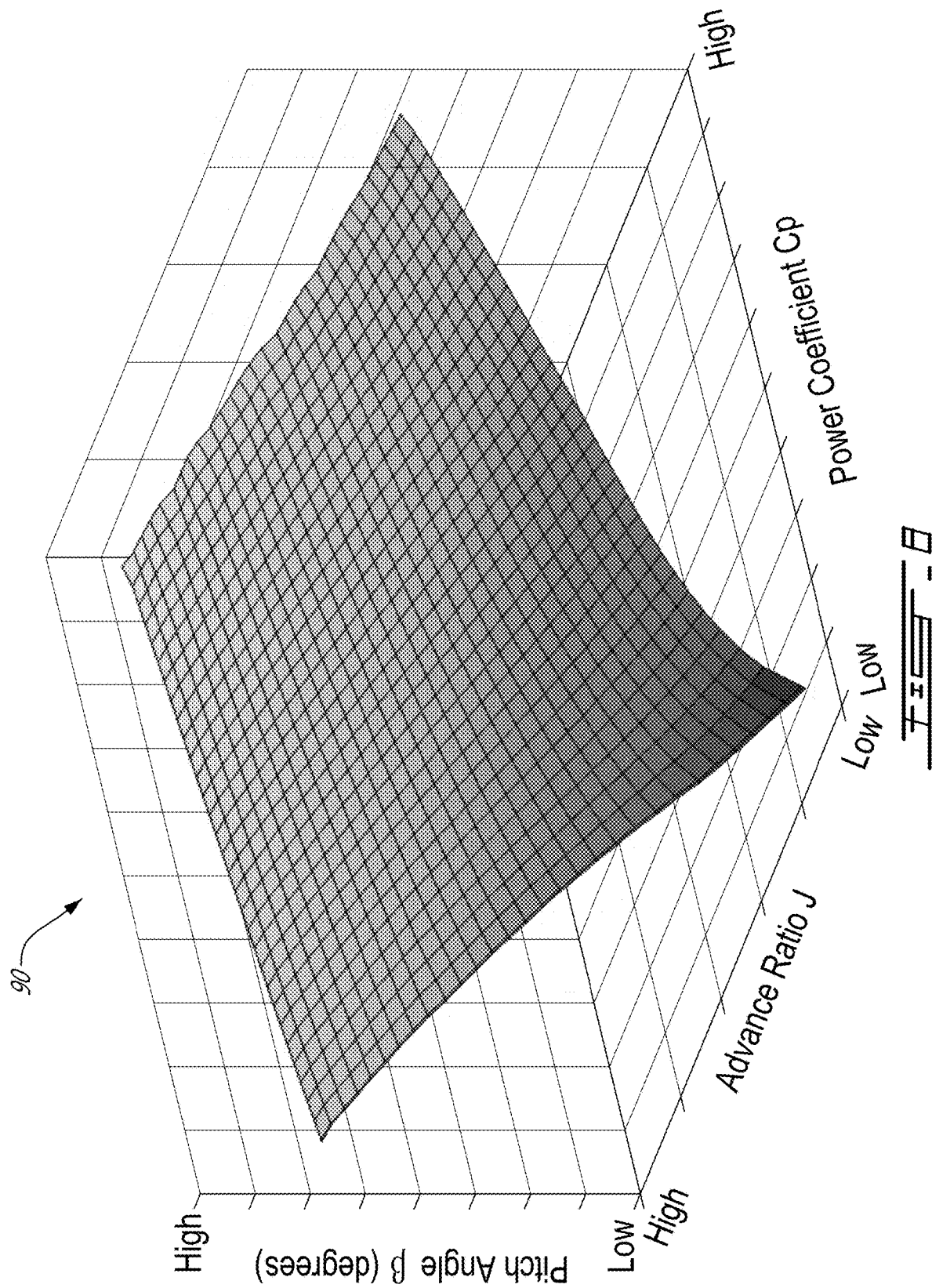

MODEL-BASED SPEED GOVERNING FOR VARIABLE-PITCH PROPELLER

TECHNICAL FIELD

The disclosure relates generally to aircraft power plants, and more particularly to controlling a rotational speed of a variable-pitch propeller configured to propel an aircraft.

BACKGROUND

Some turboprop aircraft engines are equipped with a hydro-mechanical propeller governor to maintain a desired rotational speed of the propeller. The use of a digital speed control system to control oil flow to a hydraulic actuator of the variable-pitch propeller can provide operational advantages when controlling the rotational speed of the variable-pitch propeller. However, existing propeller speed control systems may not operate at the most desirable performance level over the entire flight envelope. Improvement is desirable.

SUMMARY

In one aspect, the disclosure describes a method for controlling a variable-pitch propeller of an aircraft. The method comprises:
using a feedback controller, operating the variable-pitch propeller at a current operating condition including a current rotational speed;
determining a speed error between the current rotational speed of the variable-pitch propeller and a set point rotational speed for the variable-pitch propeller;
determining a power coefficient of the variable-pitch propeller at the current operating condition;
determining an advance ratio of the variable-pitch propeller at the current operating condition;
determining a gain for the feedback controller, the gain being scheduled based on the power coefficient of the variable-pitch propeller and the advance ratio of the variable-pitch propeller;
using the feedback controller, determining a propeller pitch command based on the speed error and using the gain; and
adjusting a pitch of the variable-pitch propeller according to the propeller pitch command to reduce the speed error.

The gain may be a proportional gain.

The method may comprise determining a derivative gain for the feedback controller. The derivative gain may be scheduled based on the power coefficient of the variable-pitch propeller and the advance ratio of the variable-pitch propeller. The propeller pitch command may be determined based on the speed error and using the proportional gain and the derivative gain.

The feedback controller may be devoid of an integral term.

The gain may be a derivative gain.

The pitch of the variable-pitch propeller may be adjustable using an actuator. The gain may be a proportional gain. The method may include: using a relationship between a pitch angle of the variable-pitch propeller, the power coefficient of the variable-pitch propeller and the advance ratio of the variable-pitch propeller: determining a first rate of change of the advance ratio with respect to the pitch angle at the power coefficient and the advance ratio of the variable-pitch propeller; and determining a second rate of change of the power coefficient with respect to the pitch angle at the power coefficient and the advance ratio of the variable-pitch propeller; determining a third rate of change of an actuation position of the actuator with respect to the pitch angle at the current operating condition; determining a fourth rate of change of a propeller rotational speed with respect to the advance ratio at the current operating condition; and determining the proportional gain using the first rate of change, the second rate of change, the third rate of change and the fourth rate of change.

The method may comprise determining a derivative gain for the feedback controller using the second rate of change and the third rate of change. The propeller pitch command may be determined based on the speed error using the proportional gain and the derivative gain.

The actuator may be a hydraulic actuator. The method may include determining the proportional gain using:

$$Kp = \frac{-B \cdot Ap \cdot K_{CP2B}\left(\frac{2Cp}{NPf} - \frac{K_{NP2J}K_{J2B}}{K_{CP2B}}\right)}{ku \cdot K_{X2B}}$$

where Kp is the proportional gain, B is a constant for pole-zero cancellation, Ap is a piston area of the actuator, $K_{CP2B}$ is the second rate of change, Cp is the power coefficient, NPf is the current rotational speed of the variable-pitch propeller, $K_{NP2J}$ is the fourth rate of change, $K_{J2B}$ is the first rate of change, ku is a constant for units conversion, and $K_{X2B}$ is the third rate of change.

The feedback controller may be a proportional-derivative feedback controller. The method may include determining a derivative gain for the feedback controller using:

$$Kd = \frac{-B \cdot Ap \cdot J \cdot 60^2 \cdot 550 K_{CP2B}}{ku \cdot K_{X2B} \cdot \rho \cdot NPf^2 \cdot 5252.2 D^5}$$

where Kd is the derivative gain, J is the advance ratio, ρ is an ambient air density and D is an outer diameter of the variable-pitch propeller. The propeller pitch command may be determined based on the speed error using the proportional gain and the derivative gain.

The current operating condition of the variable-pitch propeller may produce forward thrust for the aircraft. The proportional gain and the derivative gain may be determined without a sensed pitch angle of the variable-pitch propeller.

The current operating condition of the variable-pitch propeller may produce forward thrust for the aircraft. The gain may be determined without a sensed pitch angle of the variable-pitch propeller.

The power coefficient may be determined from a torque applied to the variable-pitch propeller, the current rotational speed of the variable-pitch propeller, an ambient air density, and an outer diameter of the variable-pitch propeller.

The advance ratio may be determined from an air speed of the aircraft, the current rotational speed of the variable-pitch propeller, and an outer diameter of the variable-pitch propeller.

Embodiments may include combinations of the above features.

In another aspect, the disclosure describes a system for controlling a variable-pitch propeller of an aircraft. The system comprises:
a sensor for sensing a current rotational speed of the variable-pitch propeller;

an actuator for adjusting a pitch angle of blades of the variable-pitch propeller; and one or more controllers operatively connected to the sensor and to the actuator, the one or more controllers being configured to, when the variable-pitch propeller is operating in a current forward thrust condition including the current rotational speed:

determine a speed error between the current rotational speed of the variable-pitch propeller and a set point rotational speed for the variable-pitch propeller;

determine a power coefficient of the variable-pitch propeller at the current forward thrust condition;

determine an advance ratio of the variable-pitch propeller at the current forward thrust condition;

determine a gain for a feedback control loop, the gain being scheduled based on the power coefficient of the variable-pitch propeller and the advance ratio of the variable-pitch propeller; and use the feedback control loop to adjust the pitch angle of the blades of the variable-pitch propeller based on the speed error and the gain to reduce the speed error.

The actuator may be a hydraulic actuator. The gain may be a proportional gain. The one or more controllers may be configured to determine the proportional gain using:

$$Kp = \frac{-B \cdot Ap \cdot K_{CP2B}\left(\frac{2Cp}{NPf} - \frac{K_{NP2J}K_{J2B}}{K_{CP2B}}\right)}{ku \cdot K_{X2B}}$$

where Kp is the proportional gain, B is a constant for causing pole-zero cancellation, Ap is a piston area of the actuator, $K_{CP2B}$ is a rate of change of the power coefficient with respect to the pitch angle at the power coefficient and the advance ratio of the variable-pitch propeller, Cp is the power coefficient, NPf is the current rotational speed of the variable-pitch propeller, $K_{NP2J}$ is a rate of change of a propeller rotational speed with respect to the advance ratio at the current forward thrust condition, $K_{J2B}$ is a rate of change of the advance ratio with respect to the pitch angle at the power coefficient and the advance ratio of the variable-pitch propeller, ku is a constant for units conversion, and $K_{X2B}$ is a rate of change of an actuation position of the actuator with respect to the pitch angle at the current forward thrust condition.

The feedback control loop may be a proportional-derivative feedback control loop. The one or more controllers may be configured to determine a derivative gain using:

$$Kd = \frac{-B \cdot Ap \cdot J \cdot 60^2 \cdot 550 K_{CP2B}}{ku \cdot K_{X2B} \cdot \rho \cdot NPf^2 \cdot 5252.2 D^5}$$

where Kd is the derivative gain, J is the advance ratio, ρ is an ambient air density and D is an outer diameter of the variable-pitch propeller. The one or more controllers may be configured to adjust the pitch angle of the blades of the variable-pitch propeller based on the speed error using the proportional gain and the derivative gain to reduce the speed error.

The one or more controllers may be configured to determine the proportional gain and the derivative gain without a sensed pitch angle of the blades of the variable-pitch propeller.

The actuator may be a hydraulic actuator. The gain may be a derivative gain. The one or more controllers may be configured to determine the derivative gain using:

$$Kd = \frac{-B \cdot Ap \cdot J \cdot 60^2 \cdot 550 K_{CP2B}}{ku \cdot K_{X2B} \cdot \rho \cdot NPf^2 \cdot 5252.2 D^5}$$

where Kd is the derivative gain, B is a constant for causing pole-zero cancellation, Ap is a piston area of the actuator, J is the advance ratio, $K_{CP2B}$ is a rate of change of the power coefficient with respect to the pitch angle at the power coefficient and the advance ratio of the variable-pitch propeller, ku is a constant for units conversion, $K_{X2B}$ is a rate of change of an actuation position of the actuator with respect to the pitch angle at the current forward thrust condition, ρ is an ambient air density, NPf is the current rotational speed of the variable-pitch propeller, and D is an outer diameter of the variable-pitch propeller.

Embodiments may include combinations of the above features.

In a further aspect, the disclosure describes a power plant for propelling an aircraft. The power plant comprises:

a variable-pitch propeller configured to propel the aircraft;

an actuator for adjusting a pitch angle of blades of the variable-pitch propeller;

a source of motive power configured to drive the variable-pitch propeller; and a propeller controller operatively connected to the variable-pitch propeller and configured to, when the variable-pitch propeller is operating in a current operating condition including a current rotational speed:

determine a speed error between the current rotational speed of the variable-pitch propeller and a set point rotational speed for the variable-pitch propeller;

determine a power coefficient of the variable-pitch propeller at the current operating condition;

determine an advance ratio of the variable-pitch propeller at the current operating condition;

determine a gain for a feedback control loop, the gain being scheduled based on the power coefficient of the variable-pitch propeller and the advance ratio of the variable-pitch propeller; and use the feedback control loop to adjust the pitch angle of the blades of the variable-pitch propeller based on the speed error and using the gain to reduce the speed error.

The actuator may be a hydraulic actuator. The current operating condition of the variable-pitch propeller may be a forward thrust condition. The gain may be a proportional gain. The propeller controller may be configured to determine the proportional gain using:

$$Kp = \frac{-B \cdot Ap \cdot K_{CP2B}\left(\frac{2Cp}{NPf} - \frac{K_{NP2J}K_{J2B}}{K_{CP2B}}\right)}{ku \cdot K_{X2B}}$$

where Kp is the proportional gain, B is a constant for causing pole-zero cancellation, Ap is a piston area of the actuator, $K_{CP2B}$ is a rate of change of the power coefficient with respect to the pitch angle at the power coefficient and the advance ratio of the variable-pitch propeller, Cp is the power coefficient, NPf is the current rotational speed of the variable-pitch propeller, $K_{NP2J}$ is a rate of change of a propeller rotational speed with respect to the advance ratio at the current operating condition, $K_{J2B}$ is a rate of change of the advance ratio with respect to the pitch angle at the power coefficient and the advance ratio of the variable-pitch propeller, ku is a constant for units conversion, and $K_{X2B}$ is a rate of change of an actuation position of the actuator with respect to the pitch angle at the current operating condition.

The feedback control loop may be a proportional-derivative feedback control loop. The propeller controller may be configured to determine a derivative gain using:

$$Kd = \frac{-B \cdot Ap \cdot J \cdot 60^2 \cdot 550 K_{CP2B}}{ku \cdot K_{X2B} \cdot \rho \cdot NPf^2 \cdot 5252.2D^5}$$

where Kd is the derivative gain, J is the advance ratio, $\rho$ is an ambient air density and D is an outer diameter of the variable-pitch propeller.

The propeller controller may be configured to use the feedback control loop to adjust the pitch angle of the blades of the variable-pitch propeller based on the speed error using the proportional gain and the derivative gain to reduce the speed error.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIGS. 7A-7C are exemplary look-up tables for use by the gain(s) scheduler of the propeller controller of FIG. 5; and FIG. 8 shows a three-dimensional plot of an exemplary relationship between a pitch angle of a variable-pitch propeller, a power coefficient of the propeller and the advance ratio of the propeller.

DETAILED DESCRIPTION

The present disclosure describes systems and methods for controlling a rotational speed of a variable-pitch propeller of an aircraft. In some embodiments, the systems and methods described herein may provide benefits associated with a digital speed control system while providing improved closed-loop control performance over multiple regions of the flight envelope or over the substantially entire flight envelope. For example, the systems and methods described herein may permit one or more variable controller gains to be scheduled (e.g., optimized) for dynamic characteristics in different regions of the flight envelope based on a model of the propeller. The use of the propeller model may permit the controller gain(s) to be scheduled without knowledge of the pitch angle of the blades of the variable-pitch propeller. For example, using the model of the propeller, the controller gain(s) may be scheduled based on a current power coefficient of the propeller and a current advance ratio of the propeller, which may be computed using parameters (other than pitch angle) that are measured/sensed or otherwise available onboard an aircraft.

Aspects of various embodiments are described through reference to the drawings.

The term "connected" may include both direct connection (in which two elements contact each other) and indirect connection (in which at least one additional element is located between the two elements). The term "substantially" as used herein may be applied to modify any quantitative representation which could permissibly vary without resulting in a change in the basic function to which it is related.

Figure 1:
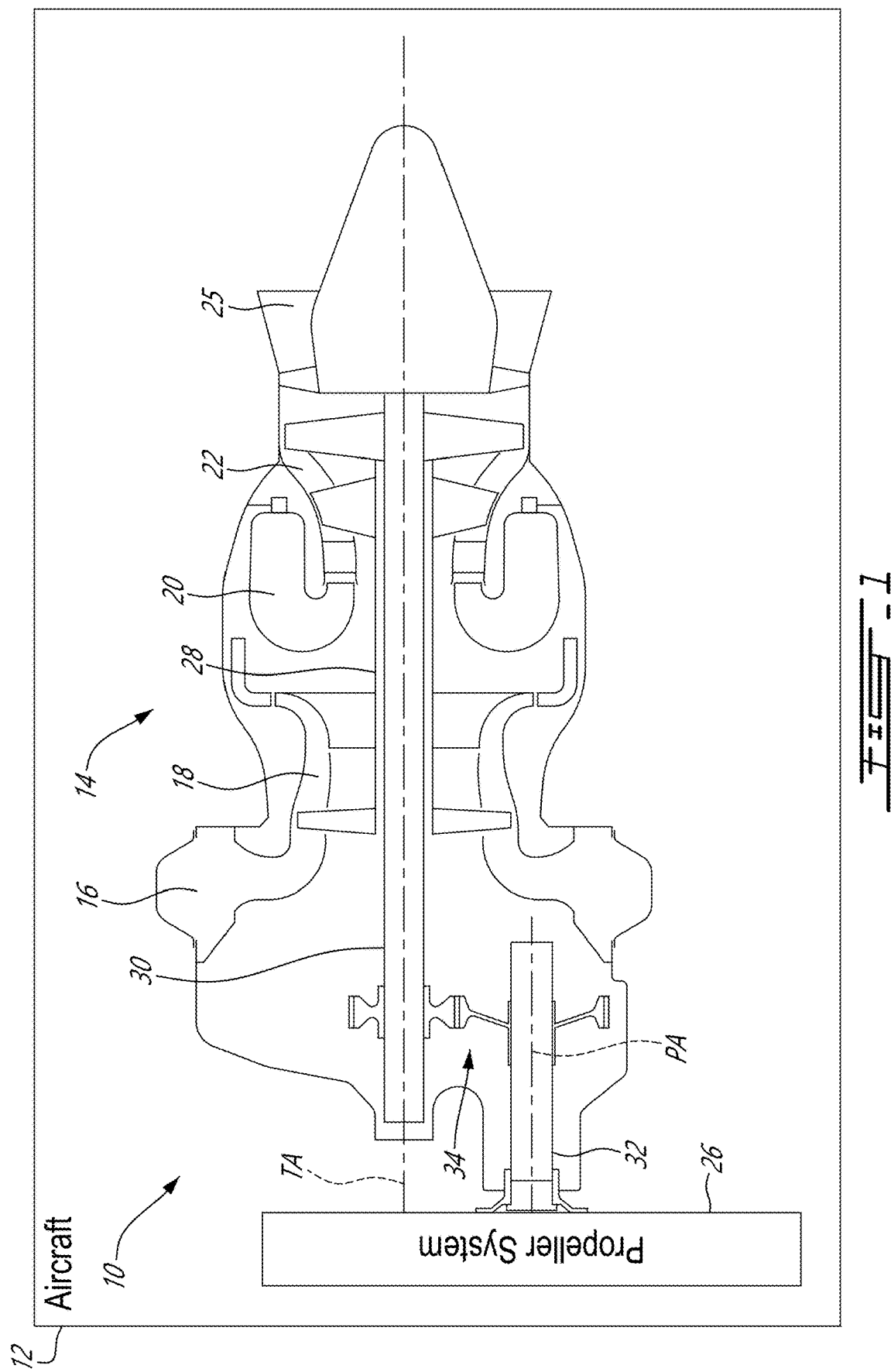
FIG. 1 is a schematic axial cross-section view of an aircraft power plant with a propeller system as described herein.

FIG. 1 is an axial cross-sectional view of aircraft power plant 10 (referred hereinafter as "power plant 10") as described herein. Power plant 10 may be used to propel aircraft 12 during one or more phases of operation (e.g., flight) of aircraft 12. In some embodiments, aircraft 12 may be a fixed wing (e.g., turboprop) aircraft. Aircraft 12 may include one or more power plants 10 for propelling aircraft 12. As illustrated in FIG. 1, power plant 10 may be a turboprop power plant including gas turbine engine 14 (referred hereinafter as "engine 14"). Engine 14 may be of a type preferably provided for use in subsonic flight. Engine 14 may include (e.g., radial) air inlet 16 into which ambient air is received and conveyed toward compressor 18. In some embodiments, compressor 18 may be a multistage compressor that pressurizes the air received via air inlet 16. Engine 14 may include combustor 20 in which the compressed air received from compressor 18 is mixed with a combustible fuel delivered from a fuel tank and ignited to generate an annular stream of hot combustion gas. Engine 14 may include turbine section 22 to extract energy from the combustion gas and convert the energy into motive power to drive an air mover such as propeller 24 (shown in FIG. 2) and thereby propel aircraft 12. The combustion gas may be exhausted from engine 14 via exhaust duct 25. Propeller 24 may be part of propeller system 26 shown schematically in FIG. 1.

In various embodiments, engine 14 may be a single spool gas turbine engine or a multi-spool gas turbine engine. For example, engine 14 may include a high-pressure spool including one or more high-pressure turbines of turbine section 22, high-pressure shaft 28 and one or more stages of compressor 18. The high-pressure turbine may drive the rotation of high-pressure shaft 28. Engine 14 may include a low-pressure spool that is separately rotatable from the high-pressure spool. In other words, the high-pressure spool and the low-pressure spool may be mechanically disconnected to permit one spool to freely rotate relative to the other. The low-pressure spool may include one or more low-pressure turbines, low-pressure shaft 30 and optionally one or more stages of compressor 18. In some embodiments, high-pressure shaft 28 and low-pressure shaft 30 may be coaxial where high-pressure shaft 28 may be hollow to permit the passage of low-pressure shaft 30 therethrough. The low-pressure turbine may be rotatable about turbine axis TA and may drive the rotation of low-pressure shaft 30 and may also drive the rotation of propeller 24. Propeller 24 may be supported by propeller shaft 32, which may be in torque transmitting engagement with low-pressure shaft 30 via gear train 34. Propeller shaft 32 and propeller 24 may be rotatable about propeller axis PA, which may be parallel to and offset from turbine axis TA. In other embodiments, propeller 24 and low-pressure shaft 30 may be coaxial. In some embodiments, gear train 34 may be of a speed-reducing type so that the rotational speed of propeller shaft 32 may be lower than the rotational speed of low-pressure shaft 30 and of the low-pressure turbine during operation of power plant 10. Gear train 34 may be part of a speed-reducing gear box also known as a reduction gear box (RGB).

Propeller system 26 may be integrated into other types of power plants not necessarily including a gas turbine engine. For example, in some embodiments, power plant 10 may include one or more sources of motive power drivingly connectable to propeller 24. Source(s) of motive power may include an electric motor and/or a thermal engine such as a piston engine or a rotary (e.g., Wankel) engine drivingly connectable to propeller 24. In some embodiments, power plant 10 may be a hybrid power plant including an electric motor and a thermal engine that may drive propeller 24 separately and/or together.

Figure 2:
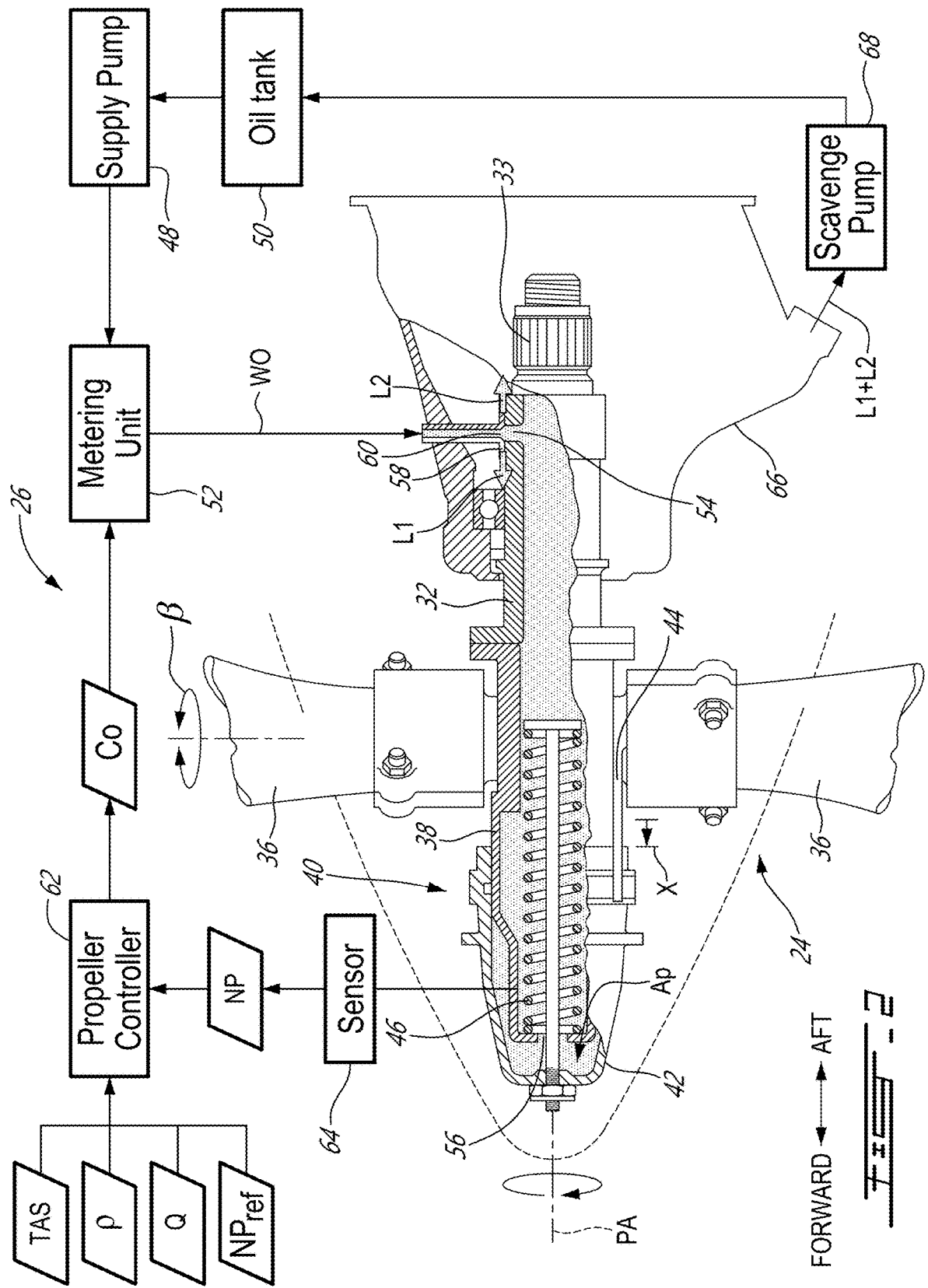
FIG. 2 is a schematic illustration of an exemplary propeller system of the aircraft power plant of FIG. 1.

FIG. 2 is a schematic illustration of an exemplary propeller system 26 of power plant 10. FIG. 2 includes a partial side cutaway view showing an interior of actuator 40. Actuator 40 is shown as a hydraulic actuator as an example. However, in some embodiments, the systems and methods described herein may be applicable to other types (e.g., electric, pneumatic) actuators. Propeller system 26 may include propeller 24 and a control architecture suitable for controlling a (i.e., sensed) rotational speed of propeller 24 during operation of aircraft 12. Propeller 24 may be a bladed rotor including (e.g., three, four or more) blades 36 extending radially outwardly from hub 38 and rotatable with propeller shaft 32 about propeller axis PA. Propeller shaft 32 may be in torque-transmitting engagement with engine 14 or another source of motive power via (e.g., splined) interface 33. Hub 38 may be fixedly connected (e.g., fastened) to propeller shaft 32. Blades 36 may also be pivotally adjustable relative to hub 38 so that pitch angle β (also called "beta" angle) of blades 36 (also referenced herein as "propeller pitch") may be controllably adjusted. Blades 36 may be adjustable within a range of pitch angles β to correspondingly modulate the angle of attack of blades 36 and vary the amount of forward thrust or reverse thrust depending the selected mode of operation of propeller 24. Blades 36 may also be adjustable to a feather position (also known as "feathering") where blades 36 are turned so that the leading edges are pointed essentially in the direction of flight. In this position, the aerodynamic forces on propeller 24 may result in a relatively low drag condition. Feathering may be employed if power plant 10 must be shut down during flight for example.

Pitch angle β of blades 36 may be controllably varied to vary a rotational speed of propeller 24 for a selected power output from engine 14. Reducing (fining) pitch angle β may reduce the resistance to rotation and may result in a rotational speed increase. On the other hand, increasing (coarsing) pitch angle β toward the feather position may increase the resistance to rotation and may result in a rotational speed decrease.

In case of a turboprop installation, a power (i.e., throttle) lever may be adjusted by a pilot of aircraft 12 to select a desired output power from engine 14, and a separate condition lever may be adjusted by the pilot of aircraft 12 to separately select a desired set point rotational speed NPref of propeller 24. The selected output power from engine 14 in combination with the set point rotational speed NPref of propeller 24 may dictate the output thrust generated by power plant 10. In some embodiments, functionalities of the power lever and the condition lever may be combined into a single (e.g., thrust) lever and a desired set point rotational speed NPref may be derived from a position of the thrust lever. In various embodiments, set point rotational speed NPref may be predetermined or selected by the flight crew via any suitable interface. In some embodiments, set point rotational speed NPref may be selected automatically by a computer of aircraft 12 based on one or more inputs.

Pitch angle β of blades 36 may be adjusted using actuator 40 defined by hollow hub 38 (also known as "spider hub") and dome 42. An interior of dome 42 may be in fluid communication with an interior of hub 38 so that oil delivered to the interior of hub 38 may flow into the interior of dome 42 and cause dome 42 to move relative to hub 38 axially away (i.e., forward) of propeller 24 along propeller axis PA. Dome 42 may be connected to blades 36 via one or more levers 44 (arms) that are pivotally connected to both dome 42 and blades 36. In some embodiments, each blade 36 may be operatively connected to dome 42 via a respective levers 44. Axial translation of dome 42 relative to hub 38 may cause pivoting of blades 36 to thereby change pitch angle β of blades 36.

Actuator 40 may be single-acting so that as hydraulic fluid (oil) is delivered to the interior of hub 38, dome 42 is displaced forwardly (e.g., see axial position x) to thereby compress spring 46. Dome 42 may function as a piston axially movable relative to hub 38 within a range of axial positions. Exemplary axial position X of dome 42 is shown in FIG. 2 relative to a reference (e.g., zero) position. Dome 42 may define piston area Ap onto which hydraulic pressure from the oil is applied to dome 42 to cause dome 42 to move forward against the resistance of spring 46. Piston area Ap may be a projected area of the interior of dome 42 as seen from a position along propeller axis PA and aft of dome 42, that is exposed to the hydraulic pressure to apply a forward axial force on dome 42.

As oil is released from (e.g., leaks out of) the interior of hub 38, spring 46 urges dome 42 to return and move rearwardly relative to hub 38 toward propeller 24 and thereby forces oil out of actuator 40 by way of oil leakage L1, L2. In some embodiments, the rearward movement of dome 42 may cause pitch angle β of blades 36 to move toward the feather position so that in the event of loss of oil pressure or a failure preventing oil from being delivered to actuator 40 during flight, pitch angle β of blades 36 may automatically default toward the feather position to reduce drag during flight.

Oil may be delivered to the interior of hub 38 using a suitable hydraulic system to alter pitch angle β of blades 36 to thereby obtain a desired rotational speed of propeller 24. Supply pump 48 may receive oil from oil tank 50 and drive the oil to metering unit 52, which may control oil flow Wo to actuator 40. Metering unit 52 may include one or more controllable (throttling) valves that may be controllably adjusted to control oil flow Wo to actuator 40. In some embodiments, metering unit 52 may include an electrohydraulic servo valve (EHSV) for example. The oil from metering unit 52 may be delivered to the interior of hub 38 via an interior of propeller shaft 32 and one or more radial openings 54 (referred hereinafter in the singular) establishing fluid communication between metering unit 52 and the interior of propeller shaft 32. The interior of propeller shaft 32 may be in fluid communication with the interior of hub 38 and with the interior of dome 42 via axial opening 56 formed in the forward axial end of hub 38.

Sleeve 58 may define a fluid transfer interface between metering unit 52 and radial opening 54 of propeller shaft 32.

For example, sleeve 58 may be stationary relative to rotating propeller shaft 32. Sleeve 58 and propeller shaft 32 may define a rotary union or rotary joint permitting oil transfer from the stationary sleeve 58 to the rotating propeller shaft 32. Oil leakage L1, L2 may be desired to ensure that propeller 24 may, through the action of spring 46, return to the feather position in case of an actuation failure. The radial gap between sleeve 58 and propeller shaft 32 may be selected to provide a prescribed target for the amount of oil leakage L1, L2 under one or more operating conditions.

Propeller system 26 may include propeller controller 62 configured to control the rotational speed of propeller 24. Propeller controller 62 may be implemented digitally and may facilitate the use of relatively sophisticated control algorithms including proportional (P), proportional-derivative (PD) or proportional-derivative-integral (PID) closed loop feedback control, and optionally including lead-lag compensation for example. As explained in more details below, propeller controller 62 may use one or more gains scheduled using a mathematical model of dynamic characteristics of propeller 24 to improve control performance (i.e., system response) throughout the operation/flight envelope.

Propeller system 26 may include one or more sensors 64 (referred hereinafter in the singular) suitable for generating one or more signals indicative of the current (i.e., sensed) rotational speed NP of propeller 24. In some embodiments, sensor 64 may be a Hall effect sensor, a magnetoresistive sensor or other suitable proximity sensor. In some embodiments, sensor 64 may work in combination with a phonic wheel including one or more targets that are detected by sensor 64 as propeller shaft 32 and the phonic wheel rotate together.

Propeller controller 62 may consider the actual rotational speed NP in relation to set point rotational speed NPref and issue propeller pitch command Co, which may have the form of an electric signal indicative of a commanded oil flow to metering unit 52 in case of actuator 40 being hydraulic. In some embodiments, metering unit 52 may be part of a propeller control unit (PCU). Metering unit 52 may then cause oil flow Wo physically equivalent to propeller pitch command Co to be delivered to actuator 40. Propeller controller 62 may attempt to reduce the difference between actual rotational speed NP and set point rotational speed NPref through the issuance of propeller pitch command Co.

The oil that leaks out of actuator 40 between sleeve 58 and propeller shaft 32 (i.e., oil leakage L1, L2) may be collected into a sump defined by housing 66, optionally filtered and reused. For example, scavenge pump 68 may drive the oil collected into housing 66 back to oil tank 50.

Figure 3:
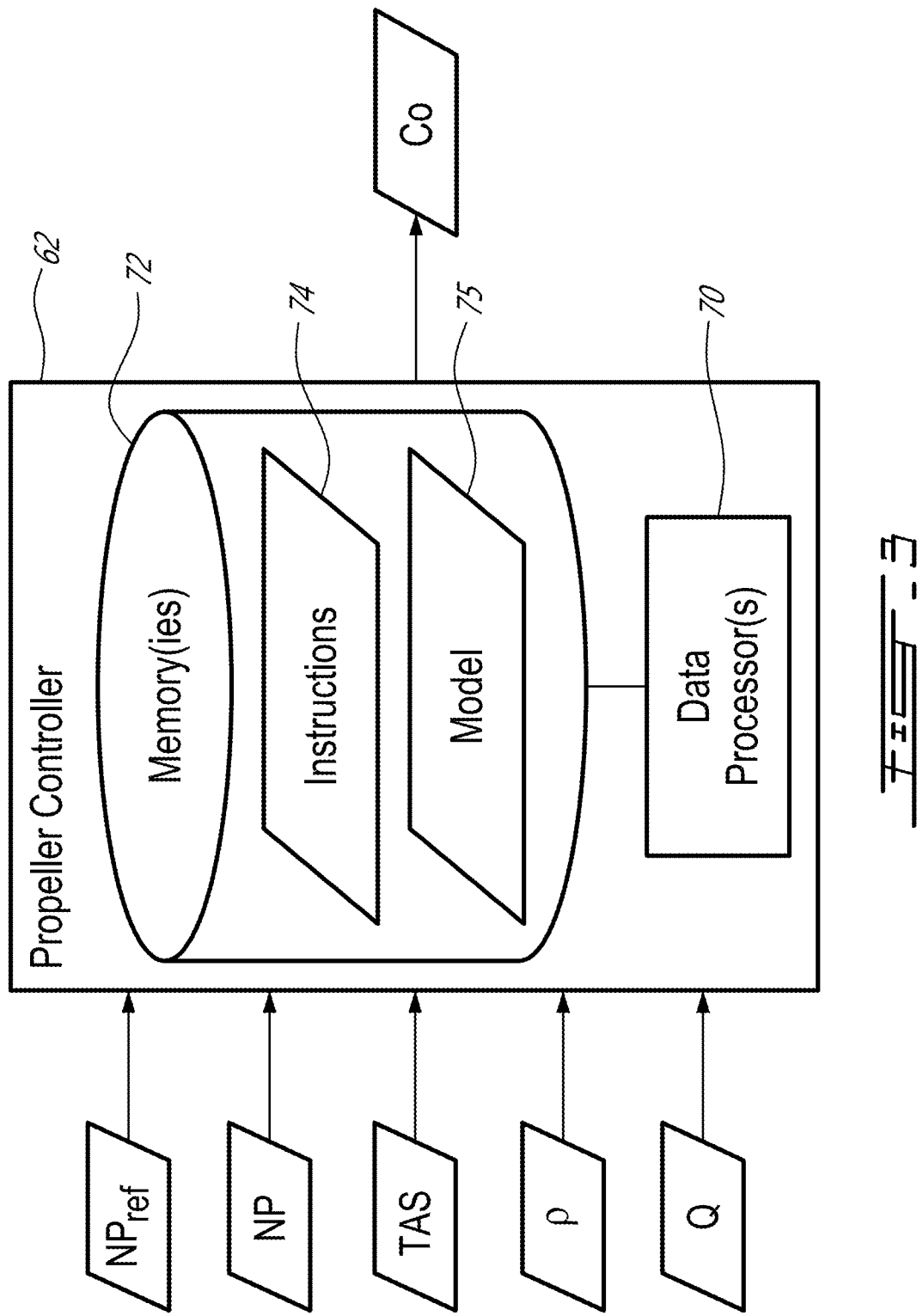
FIG. 3 is a schematic illustration of an exemplary propeller controller of the propeller system of FIG. 2.

FIG. 3 is a schematic illustration of an exemplary propeller controller 62 for controlling the rotational speed of propeller 24 be generating propeller pitch command Co to control oil flow Wo to actuator 40. Propeller controller 62 may include one or more data processors 70 (referred hereinafter in the singular) and non-transitory machine-readable memory(ies) 72 (referred hereinafter in the singular). Propeller controller 62 may be configured to regulate the rotational speed of propeller 24 and optionally also perform other tasks. Propeller controller 62 may receive input(s) such as set point rotational speed NPref, actual rotational speed NP (e.g., via sensor 64), true air speed TAS of aircraft 12, density ρ of the ambient air around aircraft 12, and torque Q delivered to propeller 24. True air speed TAS may be the speed of aircraft 12 relative to the air in which it is flying. In various embodiments or situations, one or more parameters such as rotational speed NP, true air speed TAS, density ρ and torque Q received at propeller controller 62 or derived at propeller controller 62 based on other input(s) may be indicative of the current operating condition within the operating envelope of propeller 24.

The inputs to propeller controller 62 may be sensed or computed based on one or more other sensed parameters. For example, density ρ of the ambient air around aircraft 12 may be derived based on a sensed altitude of aircraft 12. Torque Q delivered to propeller 24 may be sensed using a known or other suitable (e.g., mechanical or electric) torque measurement technique. True air speed TAS may be calculated using other variables such as outside air temperature, pressure altitude, and indicated air speed for example. Propeller controller 62 may use the input(s) received to perform one or more procedures or steps defined by instructions 74 stored in memory 72 and executable by processor(s) 70 to generate one or more outputs such as propeller pitch command Co.

Model 75 of propeller 24 may be stored in memory 72 of propeller controller 62 and used by instructions 74 to generate propeller pitch command Co. Model 75 may include dynamic characteristics of propeller 24. In some embodiments, model 75 may include mathematical equations and/or look-up tables (LUTs). In some embodiments, model 75 may include characteristics such as physical properties (e.g., inertia and outer diameter) of propeller 24, and partial derivatives from input to output. Model 75 may be used with the parameter(s) indicative of the operating condition of propeller 24 to schedule one or more (e.g., optimal) controller gains to improve control performance throughout the flight envelope.

Processor(s) 70 may include any suitable device(s) configured to cause a series of steps to be performed by controller 62 so as to implement a controller-implemented process such that instructions 74, when executed by controller 62 or other programmable apparatus, may cause the functions/acts specified in the methods described herein to be executed. Processor(s) 70 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 72 may include any suitable machine-readable storage medium. Memory 72 may include non-transitory controller readable storage medium such as, for example, but not limited to, an electronic, magnetic, optical, electromagnetic, infrared, or semiconductor system, apparatus, or device, or any suitable combination of the foregoing. Memory 72 may include any storage means (e.g., devices) suitable for retrievably storing machine-readable instructions 74 executable by processor(s) 70.

Figure 4:
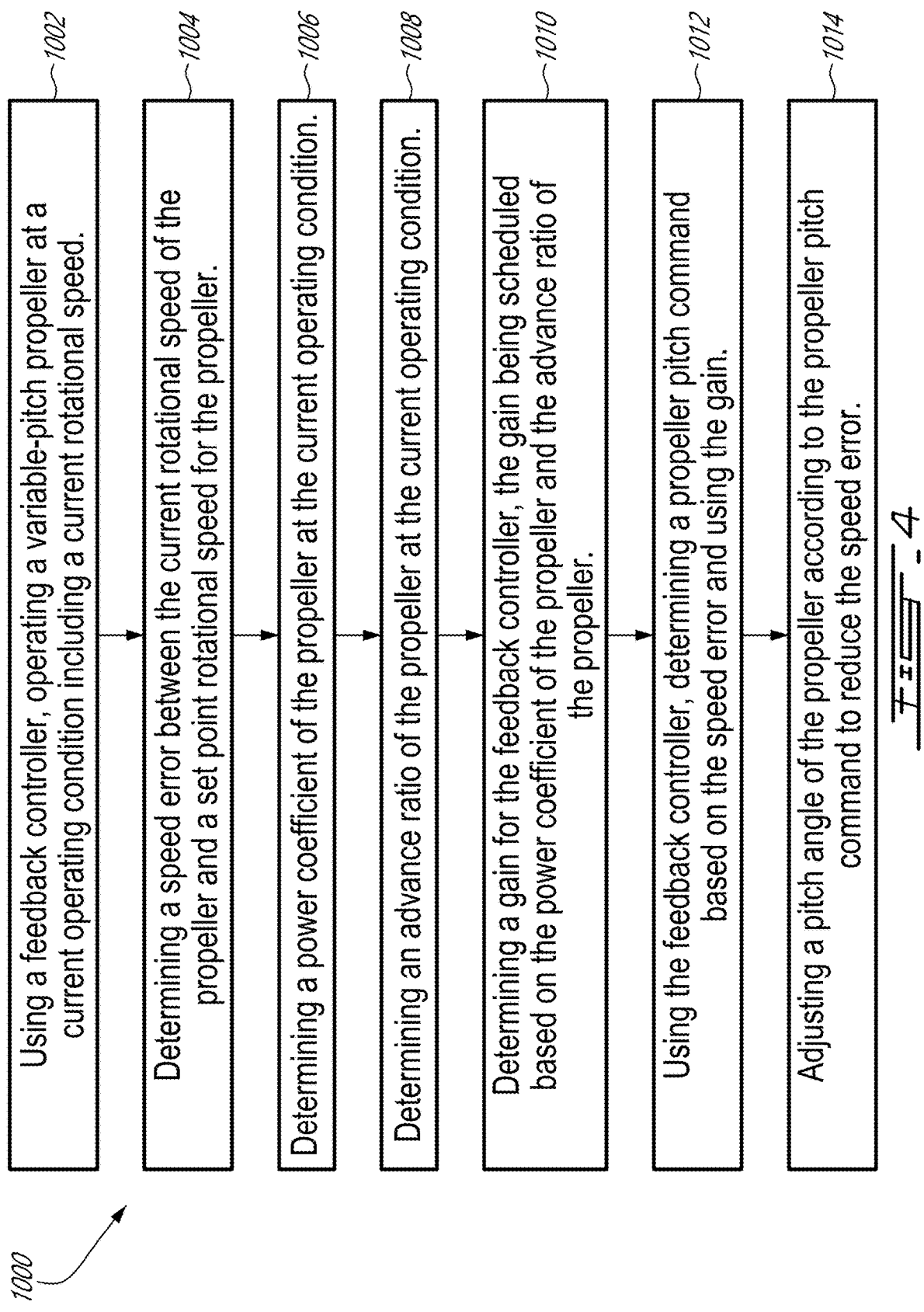
FIG. 4 is a flow diagram of a method of controlling a variable-pitch propeller of an aircraft.

FIG. 4 is a flow diagram illustrating a method 1000 of controlling variable-pitch propeller 24 of aircraft 12, or another variable-pitch propeller. Method 1000 may be performed using propeller controller 62 of propeller system 26 described herein or using another system. For example, machine-readable instructions 74 may be configured to cause propeller controller 62 to perform some or all of method 1000. Method 1000 may include elements of propeller system 26 and/or other actions disclosed herein. Method 1000 may include:

using a feedback controller 76 (shown in FIG. 5), operating propeller 24 at a current operating condition including current rotational speed NP (block 1002);

determining speed error E (shown in FIG. 5) between current rotational speed NP of propeller 24 and set point rotational speed NPref for propeller 24 (block 1004);

determining power coefficient Cp (shown in FIG. 6A) of propeller 24 at the current operating condition (block 1006);

determining advance ratio J (shown in FIG. 6B) of propeller 24 at the current operating condition (block 1008);

determining gain(s) (e.g., proportional gain Kp and/or derivative gain Kd) for feedback controller 76, the gain(s) being scheduled based on power coefficient Cp of propeller 24 and advance ratio J of propeller 24 (block 1010);

using feedback controller 76, determining propeller pitch command Co based on speed error E and using the gain(s) (e.g., proportional gain Kp and/or derivative gain Kd) (block 1012); and adjusting a pitch (i.e., pitch angle β) of propeller 24 according to propeller pitch command Co to reduce speed error E (block 1014).

Aspects of method 1000 are described below in reference to the subsequent figures.

Figure 5:
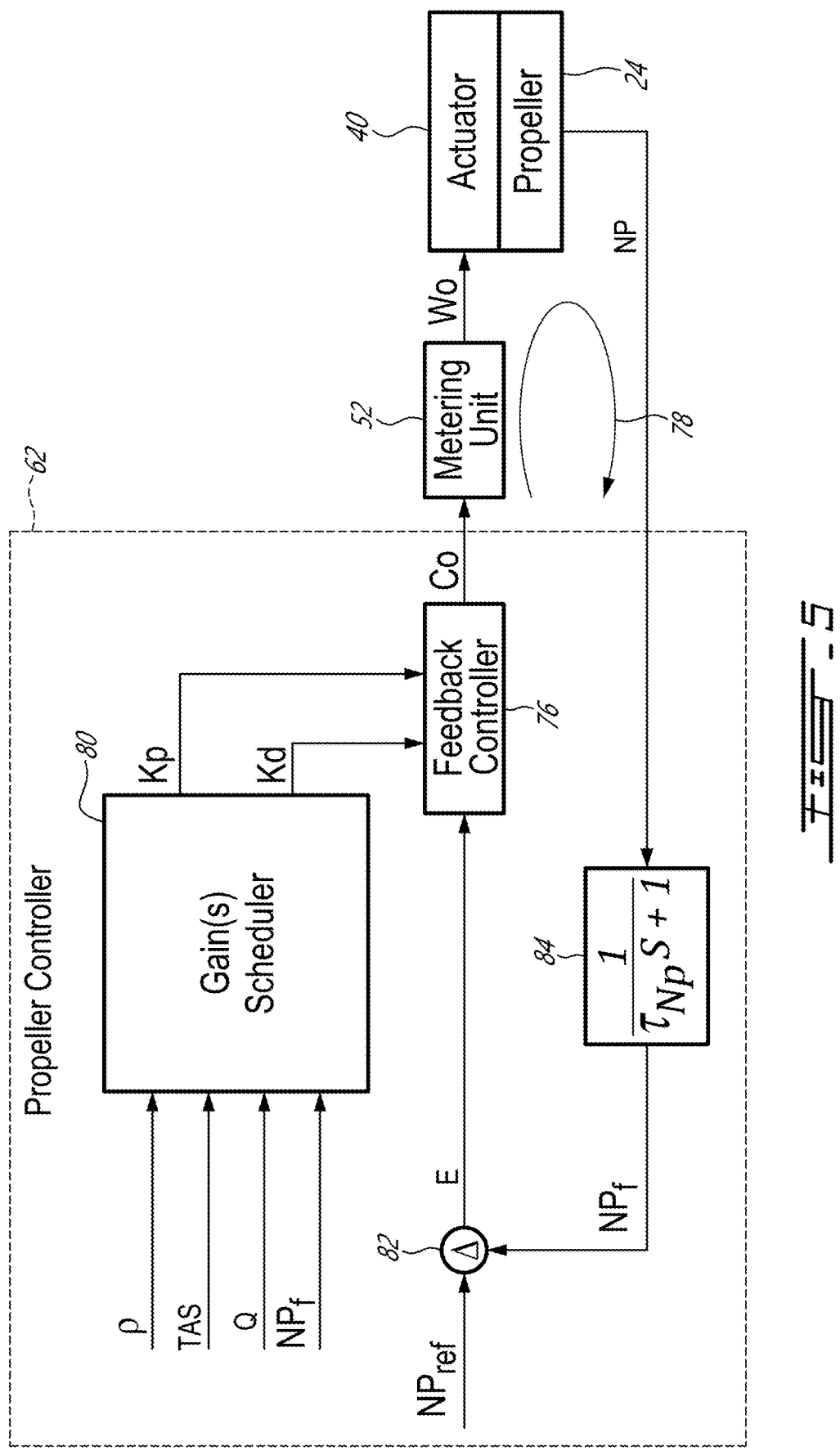
FIG. 5 is another schematic illustration of the propeller controller of FIG. 3.

FIG. 5 is another schematic illustration of propeller controller 62 shown as being operatively connected to metering unit 52, actuator 40 and propeller 24. The dynamics from oil flow Wo to a physical change in the propeller rotational speed NP are represented in blocks labelled as actuator 40 and propeller 24. Propeller controller 62 may include feedback controller 76, which may be part of feedback control loop 78 that is used to control the rotational speed of propeller 24 in a closed loop manner. Propeller controller 62 may include gain(s) scheduler 80 that is integrated with feedback control loop 78 and that is used to schedule one or more gains (e.g., proportional gain Kp and/or derivative gain Kd) based on the current operating condition of propeller 24, for improving speed control performance throughout the flight envelope of aircraft 12. Scheduling of the gains(s) using gain(s) scheduler 80 may be performed outside of feedback control loop 78. Gain(s) scheduler 80 may supply scheduled proportional gain Kp and/or derivative gain Kd to feedback controller 76.

Feedback control loop 78 may include error junction 82 where current rotational speed NP (or filtered current rotational speed NPf) of propeller 24 and set point rotational speed NPref are received and combined to determine speed error E. For example, current rotational speed NP may be subtracted from set point rotational speed NPref and speed error E may be indicative of a difference between current rotational speed NP and set point rotational speed NPref. Using speed error E, feedback controller 76 may generate propeller pitch command Co based on speed error E to control metering unit 52 and provide a corresponding oil flow Wo to actuator 40.

In various embodiments, feedback controller 76 may use a proportional (P) term and/or a derivative (D) term to amplify speed error E and apply a rotational speed correction via propeller pitch command Co. In some embodiments, feedback controller 76 may be a one-term (e.g., P or D) feedback controller. In some embodiments, feedback controller 76 may be a two-term proportional-derivative (PD) feedback controller or may be a proportional-integral-derivative (PID) feedback controller. In some embodiments, feedback controller 76 may use one or more variable gains such as proportional gain Kp and/or derivative gain Kd determined by gain(s) scheduler 80 and applicable to (e.g., optimized for) different portions of the flight envelope of aircraft 12. In some embodiments, feedback controller 76 may be devoid of an integral term. In some embodiments, the lack of an integral term in feedback controller 76 may promote stability of feedback controller 76. Proportional gain Kp may be used at feedback controller 76 to amplify speed error E by multiplying speed error E by proportional gain Kp. Derivative gain Kd may be used at feedback controller 76 to amplify speed error E by multiplying a derivative of speed error E with respect to time by derivative gain Kd.

Gain(s) scheduler 80 may receive one or more parameters indicative of the current operating condition of propeller 24. Using such parameters, gain(s) scheduler 80 may determine proportional gain Kp and/or derivative gain Kd which may vary depending on the current operating condition of propeller 24. The parameters used by gain(s) scheduler 80 may include rotational speed NP (or filtered rotational speed NPf), true air speed TAS, density ρ, torque Q, and optionally one or more other parameters other than pitch angle β. Gain(s) scheduler 80 may be used to schedule controller gain(s) when propeller 24 is operated in a forward thrust condition (i.e., producing thrust that propels aircraft 12 forward). Gain(s) scheduler 80 may be used to schedule controller gain(s) on propeller systems that do not provide measuring means for real-time feedback of pitch angle β of blades 36 of propeller 24. In other words, gain(s) scheduler 80 may be used to schedule controller gain(s) without knowledge of the exact pitch angle β of blades 36 of propeller 24 for propeller systems where gain(s) scheduling with respect to measured pitch angle β is not possible.

In some embodiments, current rotational speed NP may optionally be filtered with filter 84 to produce filtered rotational speed NPf that is used for comparison with set point rotational speed NPref at error junction 82. In various embodiments, filter 84 may be used to filter out noise and/or isolate components of signal(s) from sensor 64 that are of interest and that are indicative of current rotational speed NP of propeller 24. In some embodiments, filter 84 may be a low-pass filter. In some embodiments, filter 84 may have the following transfer function expressed in Laplace notation:

$$\frac{1}{\tau_{NP}s + 1}$$

where $\tau_{NP}$ is a time constant associated with propeller 24.

Figure 6A:
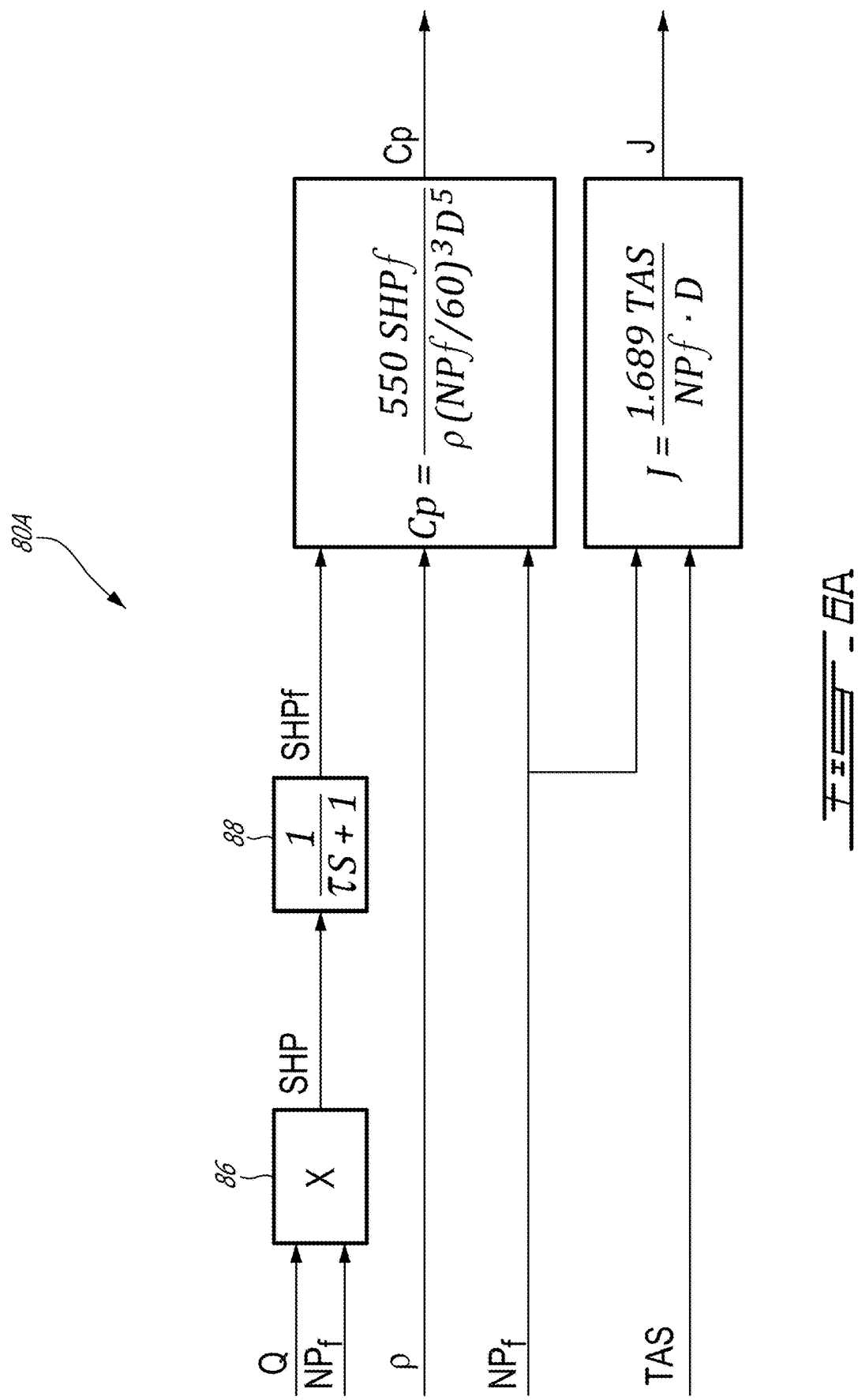
FIGS. 6A-6C are schematic illustrations of exemplary parts of a gain(s) scheduler of the propeller controller of FIG. 5.
Figure 6B:
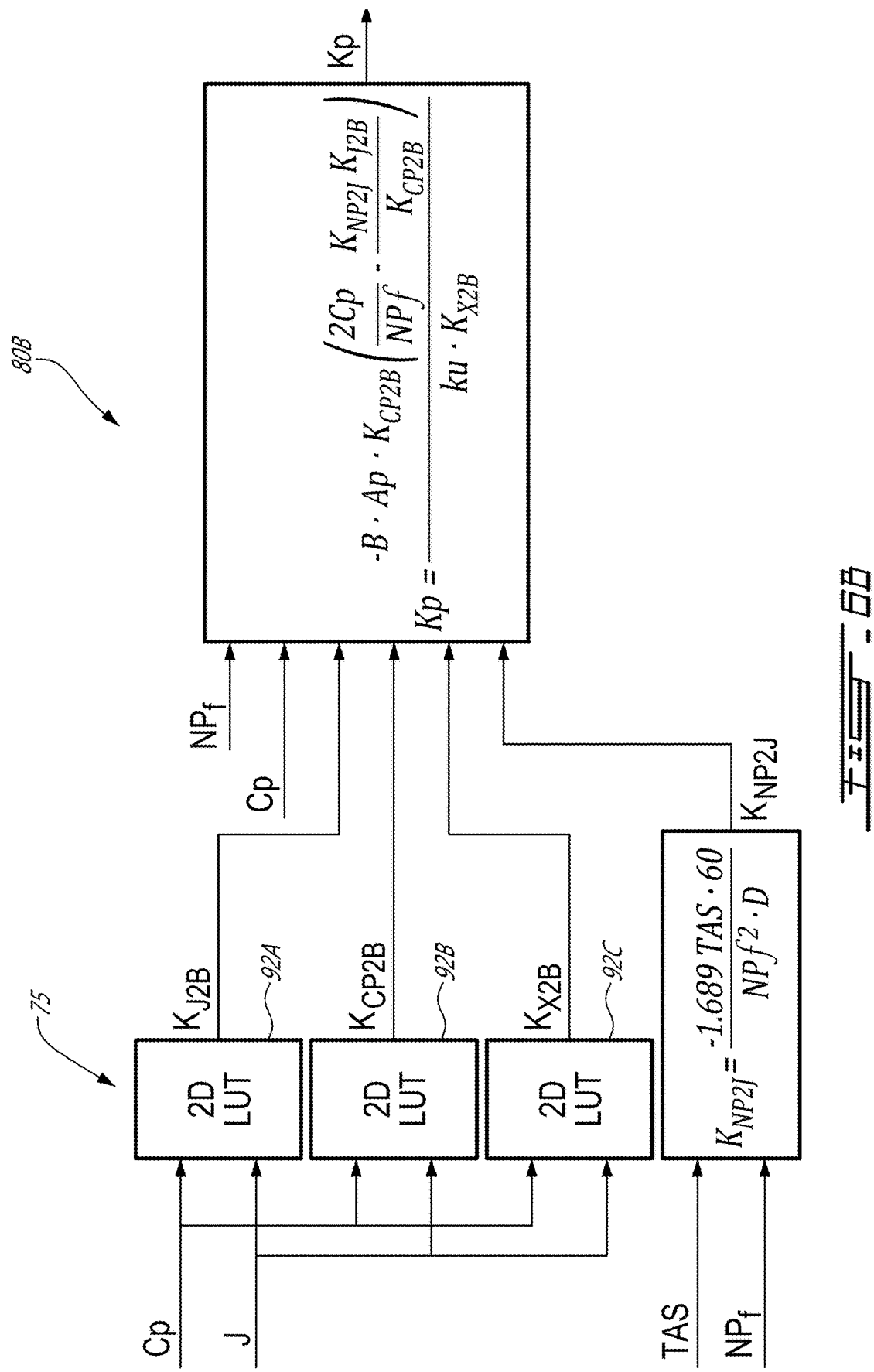
Figure 6C:
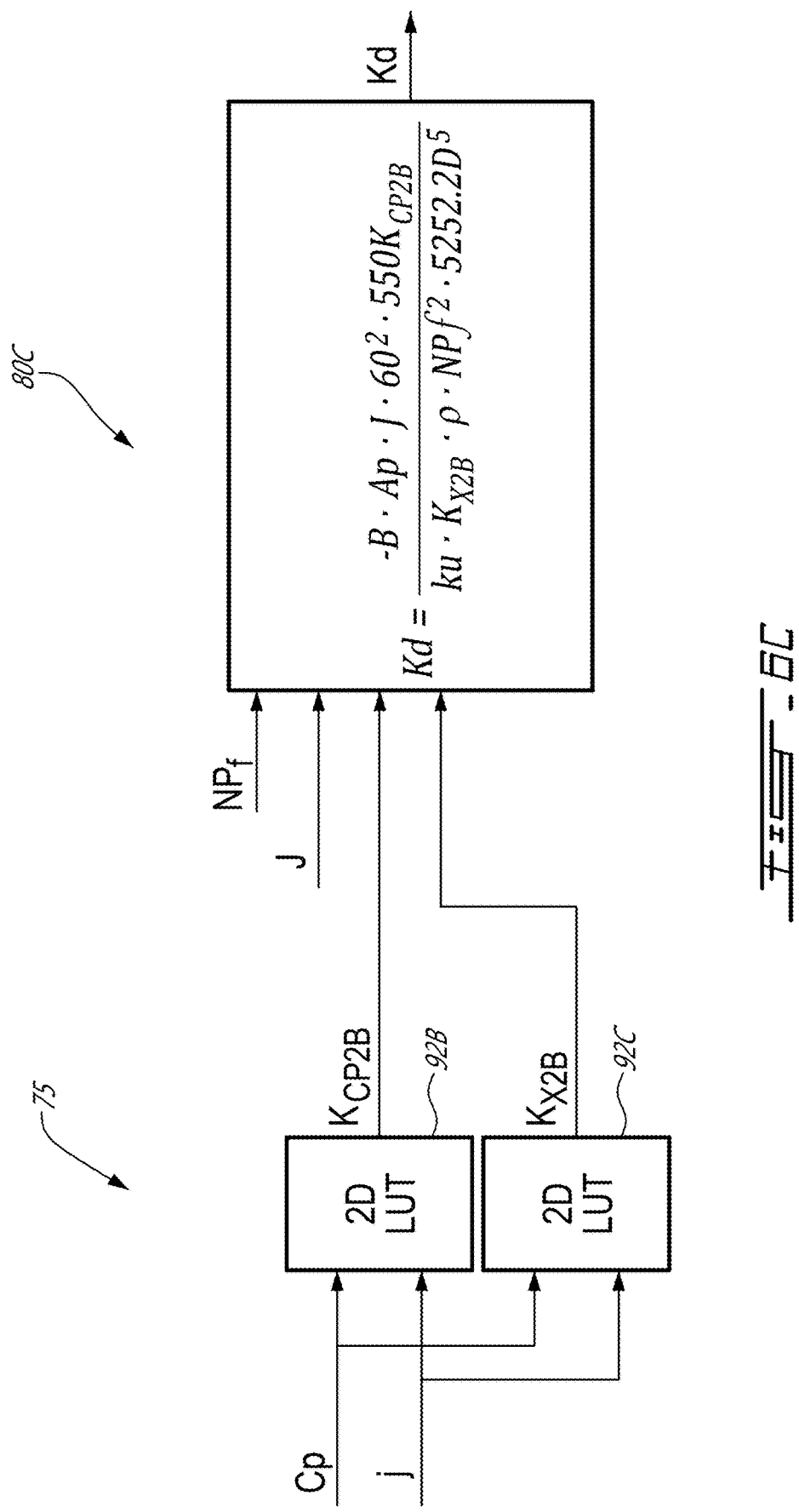

FIGS. 6A-6C are schematic illustrations of exemplary parts of gain(s) scheduler 80 of propeller controller 62 of FIG. 5. In various embodiments, gain(s) scheduler 80 may include one or more of the portions 80A-80C shown in FIGS. 6A-6C. FIG. 6A is a schematic illustration of an exemplary first portion 80A of gain(s) scheduler 80 that may be used to compute power coefficient Cp and advance ratio J. Power coefficient Cp and advance ratio J may provide an indication of the operating condition of propeller 24 and may be use as scheduling parameters for determining the gain(s). For example, power coefficient Cp is a normalized measure of the power absorbed by propeller 24. Power coefficient Cp may be used to produce propeller performance maps that may be (e.g., partially) represented in the information stored in model 75. Power coefficient Cp may provide a relatively smooth map over the flight envelope, which may promote low interpolation error, and which may permit the size and dimensions of the performance maps to be relatively small. As shown in FIG. 6A, power coefficient Cp may be determined using the following equation:

$$Cp = \frac{550\ SHPf}{\rho(NPf/60)^3 D^5}$$

using power SHP (shaft horsepower) delivered to propeller 24 or filtered power SHPf delivered to propeller 24, density ρ of the ambient air around aircraft 12, rotational speed NP of propeller 24 or filtered rotational speed NPf of propeller 24, and outer diameter D of propeller 24. In order to determine filtered power SHPf, torque Q delivered to propeller 24 and filtered rotational speed NPf may be multiplied together at multiply junction 86 to produce power SHP delivered to propeller 24. Then, power SHP may be filtered via (e.g., first order) filter 88 to account for the lag between the measured power at propeller shaft 32 and the power dissipated by propeller 24. In some embodiments, filter 88 may have the following transfer function expressed in Laplace notation:

$$\frac{1}{\tau s + 1}$$

where τ is a time constant associated with propeller 24.

Advance ratio J is a ratio of the aircraft velocity relative to the velocity of the propeller blade tip. In other words, advance ratio J may be described as a measure of the step of the helix that propeller 24 is taking in the air while turning and advancing at the same time. As shown in FIG. 6A, advance ratio J may be determined using the following equation:

$$J = \frac{1.689\ TAS}{NPf \cdot D}$$

using true air speed TAS, rotational speed NP of propeller 24 or filtered rotational speed NPf of propeller 24, and outer diameter D of propeller 24.

In various embodiments, proportional gain Kp and/or derivative gain Kd may be scheduled directly or indirectly based on power coefficient Cp and advance ratio J. For example, two-dimensional look-up tables, which may be part of model 75, may be populated empirically or by modeling and simulation to provide values of proportional gain Kp and/or derivative gain Kd respectively for different combinations of power coefficient Cp and advance ratio J. In some embodiments, proportional gain Kp and/or derivative gain Kd may instead be scheduled via intermediate partial derivatives from input to output that are themselves scheduled based on power coefficient Cp and advance ratio J. In some embodiments, the use of intermediate partial derivatives instead of scheduling proportional gain Kp and/or derivative gain Kd directly from power coefficient Cp and advance ratio J may allow for smaller look-up tables that need to be stored as part of model 75 in memory 72 of propeller controller 62.

FIG. 6B is a schematic illustration of an optional second portion 80B of gain(s) scheduler 80 that may be used to compute proportional gain Kp based on power coefficient Cp and advance ratio J using intermediate partial derivatives. Some of the partial derivatives may be based on three-dimensional relationship 90 (shown in FIG. 8) between pitch angle β of blades 36 of propeller 24, power coefficient Cp and advance ratio J of propeller 24. Relationship 90 may be determined empirically or by modeling and simulation. Instead of storing entire relationship 90 in model 75, partial derivatives at selected values of power coefficient Cp and advance ratio J may be stored in model 75 in the form of look-up tables 92A-92C (also shown in FIG. 8).

First look-up table 92A may be used to determine a first partial derivative in the form of first rate of change $K_{J2B}$ of advance ratio J with respect to pitch angle β at the current operating condition of propeller 24 represented by the current power coefficient Cp and advance ratio J of propeller 24. Second look-up table 92B may be used to determine a second partial derivative in the form of second rate of change $K_{CP2B}$ of power coefficient Cp with respect to pitch angle β at the current operating condition of propeller 24 represented by the current power coefficient Cp and advance ratio J of propeller 24. Third look-up table 92C may be used to determine a third partial derivative in the form of third rate of change $K_{X2B}$ of actuation position (e.g., axial position X of dome 42) of actuator 40 with respect to pitch angle β at the current operating condition of propeller 24 represented by the current power coefficient Cp and advance ratio J of propeller 24. Third look-up table 92C may define a kinematic relationship between axial position X of dome 42 and pitch angle β. A fourth partial derivative in the form of fourth rate of change $K_{NP2J}$ of propeller rotational speed NP with respect to advance ratio J at the current operating condition may be determined using the following equation:

$$K_{NP2J} = \frac{-1.689\ TAS \cdot 60}{NPf^2 \cdot D}$$

using true air speed TAS, rotational speed NP (or filtered rotational speed NPf) and outer diameter D of propeller 24.

With the partial derivatives determined above, proportional gain Kd may be determined using the following equation:

$$Kp = \frac{-B \cdot Ap \cdot K_{CP2B}\left(\frac{2Cp}{NPf} - \frac{K_{NP2J}K_{J2B}}{K_{CP2B}}\right)}{ku \cdot K_{X2B}}$$

using constant B, piston area Ap, second rate of change $K_{CP2B}$, power coefficient Cp, propeller speed NP or filtered propeller speed NPf, fourth rate of change $K_{NP2J}$, first rate of change $K_{J2B}$, constant ku and third rate of change $K_{X2B}$. Constant B may represent a desired bandwidth and have a value selected to achieve pole-zero cancellation to improve the stability of propeller system 26 in some situations. Specifically, constant B may be a common factor in the numerator and denominator polynomials that can be factored out and eliminated from both the numerator and denominator by algebraic simplification. ku may be a constant for conversion of units within the terms of the above equation. In some embodiments, the above equation for computing proportional gain Kp may facilitate an overall closed loop transfer function of feedback control loop 78 having first order behavior and that has an overall gain of unity.

FIG. 6C is a schematic illustration of an optional third portion 80C of gain(s) scheduler 80 that may be used to compute derivative gain Kd based on power coefficient Cp and advance ratio J using intermediate partial derivatives. Derivative gain Kd may be scheduled based on power coefficient Cp and advance ratio J of propeller 24. For example, derivative gain Kd may be determined using second rate of change $K_{CP2B}$ of power coefficient Cp with respect to pitch angle β at the current operating condition of propeller 24 represented by the current power coefficient Cp and advance ratio J of propeller 24, and third rate of change $K_{X2B}$ of actuation position (e.g., axial position X of dome 42) of actuator 40 with respect to pitch angle β at the current operating condition of propeller 24 represented by the current power coefficient Cp and advance ratio J of propeller 24. Derivative gain Kd may be determined using the following equation:

$$Kd = \frac{-B \cdot Ap \cdot J \cdot 60^2 \cdot 550 K_{CP2B}}{ku \cdot K_{X2B} \cdot \rho \cdot NPf^2 \cdot 5252.2D^5}$$

using constant B, piston area Ap, advance ratio J, second rate of change $K_{CP2B}$, constant ku, third rate of change $K_{X2B}$, ambient air density ρ, propeller speed NP or filtered propeller speed NPf and outer diameter D of propeller 24. Constant B may represent a desired bandwidth of feedback control loop 78 and have a value selected to achieve pole-zero cancellation to improve the stability of propeller system 26 in some situations. Specifically, constant B may be a common factor in the numerator and denominator polynomials that can be factored out and eliminated from both the numerator and denominator by algebraic simplification. ku may be a constant for conversion of units within the terms of the above equation. The values of B and ku may be different in the separate equations for computing proportional gain Kp and derivative gain Kd. In some embodiments, the above equation for computing derivative gain Kd may facilitate an overall closed loop transfer function of feedback control loop 78 having first order behavior and that has an overall gain of unity.

FIGS. 7A-7C are exemplary look-up tables 92A-92C for use by the gain(s) scheduler 80 of propeller controller 62. Look-up tables 92A-92C may be two-dimensional look-up tables where different numerical values of the applicable partial derivatives may be provided for different combinations of power coefficient Cp and advance ratio J. The partial derivatives (i.e., first rate of change $K_{J2B}$, second rate of change $K_{CP2B}$) in tables 92A and 92B may be populated based on relationship 90 shown in FIG. 8. The partial derivative (i.e., third rate of change $K_{X2B}$) in table 92C may be populated based on the kinematic relationship between axial position X of dome 42 and pitch angle β, which may be derived using relationship 90 and the values of power coefficient Cp and advance ratio J.

FIG. 8 shows a three-dimensional plot of an exemplary (e.g., three-dimensional) relationship 90 between pitch angle β, power coefficient Cp and advance ratio J of propeller 24. Relationship 90 may be indicative of the operation/flight envelope of propeller 24 and may be used as a basis for values stored in model 75 as explained above.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A method for controlling a variable-pitch propeller of an aircraft, the method comprising:
    using a feedback controller, operating the variable-pitch propeller at a current operating condition including a current rotational speed;
    determining a speed error between the current rotational speed of the variable-pitch propeller and a set point rotational speed for the variable-pitch propeller;
    determining a power coefficient of the variable-pitch propeller at the current operating condition;
    determining an advance ratio of the variable-pitch propeller at the current operating condition;
    determining a gain for the feedback controller, the gain being scheduled based on the power coefficient of the variable-pitch propeller and the advance ratio of the variable-pitch propeller;
    using the feedback controller, determining a propeller pitch command based on the speed error and using the gain; and
    adjusting a pitch of the variable-pitch propeller according to the propeller pitch command to reduce the speed error.

2. The method as defined in claim 1, wherein the gain is a proportional gain.

3. The method as defined in claim 2, comprising determining a derivative gain for the feedback controller, the derivative gain being scheduled based on the power coefficient of the variable-pitch propeller and the advance ratio of the variable-pitch propeller, wherein the propeller pitch command is determined based on the speed error and using the proportional gain and the derivative gain.

4. The method as defined in claim 1, wherein the feedback controller is devoid of an integral term.

5. The method as defined in claim 1, wherein the gain is a derivative gain.

6. The method as defined in claim 1, wherein:
    the pitch of the variable-pitch propeller is adjustable using an actuator;
    the gain is a proportional gain; and
    the method includes:
        using a relationship between a pitch angle of the variable-pitch propeller, the power coefficient of the variable-pitch propeller and the advance ratio of the variable-pitch propeller:
            determining a first rate of change of the advance ratio with respect to the pitch angle at the power coefficient and the advance ratio of the variable-pitch propeller; and
            determining a second rate of change of the power coefficient with respect to the pitch angle at the power coefficient and the advance ratio of the variable-pitch propeller;
        determining a third rate of change of an actuation position of the actuator with respect to the pitch angle at the current operating condition;
        determining a fourth rate of change of a propeller rotational speed with respect to the advance ratio at the current operating condition; and
        determining the proportional gain using the first rate of change, the second rate of change, the third rate of change and the fourth rate of change.

7. The method as defined in claim 6, comprising determining a derivative gain for the feedback controller using the second rate of change and the third rate of change, wherein the propeller pitch command is determined based on the speed error using the proportional gain and the derivative gain.

8. The method as defined in claim 6, wherein:
the actuator is a hydraulic actuator; and
the method includes determining the proportional gain using:

$$Kp = \frac{-B \cdot Ap \cdot K_{CP2B}\left(\frac{2Cp}{NPf} - \frac{K_{NP2J}K_{J2B}}{K_{CP2B}}\right)}{ku \cdot K_{X2B}}$$

where Kp is the proportional gain, B is a constant for pole-zero cancellation, Ap is a piston area of the actuator, $K_{CP2B}$ is the second rate of change, Cp is the power coefficient, NPf is the current rotational speed of the variable-pitch propeller, $K_{NP2J}$ is the fourth rate of change, $K_{J2B}$ is the first rate of change, ku is a constant for units conversion, and $K_{X2B}$ is the third rate of change.

9. The method as defined in claim 8, wherein:
the feedback controller is a proportional-derivative feedback controller;
the method includes determining a derivative gain for the feedback controller using:

$$Kd = \frac{-B \cdot Ap \cdot J \cdot 60^2 \cdot 550 K_{CP2B}}{ku \cdot K_{X2B} \cdot \rho \cdot NPf^2 \cdot 5252.2D^5}$$

where Kd is the derivative gain, J is the advance ratio, $\rho$ is an ambient air density and D is an outer diameter of the variable-pitch propeller; and
the propeller pitch command is determined based on the speed error using the proportional gain and the derivative gain.

10. The method as defined in claim 9, wherein:
the current operating condition of the variable-pitch propeller produces forward thrust for the aircraft; and
the proportional gain and the derivative gain are determined without a sensed pitch angle of the variable-pitch propeller.

11. The method as defined in claim 1, wherein:
the current operating condition of the variable-pitch propeller produces forward thrust for the aircraft; and
the gain is determined without a sensed pitch angle of the variable-pitch propeller.

12. The method as defined in claim 1, wherein the power coefficient is determined from a torque applied to the variable-pitch propeller, the current rotational speed of the variable-pitch propeller, an ambient air density, and an outer diameter of the variable-pitch propeller.

13. The method as defined in claim 1, wherein the advance ratio is determined from an air speed of the aircraft, the current rotational speed of the variable-pitch propeller, and an outer diameter of the variable-pitch propeller.

14. A system for controlling a variable-pitch propeller of an aircraft, the system comprising:
a sensor for sensing a current rotational speed of the variable-pitch propeller;
an actuator for adjusting a pitch angle of blades of the variable-pitch propeller; and
one or more controllers operatively connected to the sensor and to the actuator, the one or more controllers being configured to, when the variable-pitch propeller is operating in a current forward thrust condition including the current rotational speed:
determine a speed error between the current rotational speed of the variable-pitch propeller and a set point rotational speed for the variable-pitch propeller;
determine a power coefficient of the variable-pitch propeller at the current forward thrust condition;
determine an advance ratio of the variable-pitch propeller at the current forward thrust condition;
determine a gain for a feedback control loop, the gain being scheduled based on the power coefficient of the variable-pitch propeller and the advance ratio of the variable-pitch propeller; and
use the feedback control loop to adjust the pitch angle of the blades of the variable-pitch propeller based on the speed error and the gain to reduce the speed error.

15. The system as defined in claim 14, wherein:
the actuator is a hydraulic actuator;
the gain is a proportional gain; and
the one or more controllers are configured to determine the proportional gain using:

$$Kp = \frac{-B \cdot Ap \cdot K_{CP2B}\left(\frac{2Cp}{NPf} - \frac{K_{NP2J}K_{J2B}}{K_{CP2B}}\right)}{ku \cdot K_{X2B}}$$

where Kp is the proportional gain, B is a constant for causing pole-zero cancellation, Ap is a piston area of the actuator, $K_{CP2B}$ is a rate of change of the power coefficient with respect to the pitch angle at the power coefficient and the advance ratio of the variable-pitch propeller, Cp is the power coefficient, NPf is the current rotational speed of the variable-pitch propeller, $K_{NP2J}$ is a rate of change of a propeller rotational speed with respect to the advance ratio at the current forward thrust condition, $K_{J2B}$ is a rate of change of the advance ratio with respect to the pitch angle at the power coefficient and the advance ratio of the variable-pitch propeller, ku is a constant for units conversion, and $K_{X2B}$ is a rate of change of an actuation position of the actuator with respect to the pitch angle at the current forward thrust condition.

16. The system as defined in claim 15, wherein:
the feedback control loop is a proportional-derivative feedback control loop;
the one or more controllers are configured to determine a derivative gain using:

$$Kd = \frac{-B \cdot Ap \cdot J \cdot 60^2 \cdot 550 K_{CP2B}}{ku \cdot K_{X2B} \cdot \rho \cdot NPf^2 \cdot 5252.2D^5}$$

where Kd is the derivative gain, J is the advance ratio, $\rho$ is an ambient air density and D is an outer diameter of the variable-pitch propeller; and
the one or more controllers are configured to adjust the pitch angle of the blades of the variable-pitch propeller based on the speed error using the proportional gain and the derivative gain to reduce the speed error.

17. The system as defined in claim 16, wherein the one or more controllers are configured to determine the proportional gain and the derivative gain without a sensed pitch angle of the blades of the variable-pitch propeller.

18. The system as defined in claim 14, wherein:
the actuator is a hydraulic actuator;
the gain is a derivative gain; and the one or more controllers are configured to determine the derivative gain using:

$$Kd = \frac{-B \cdot Ap \cdot J \cdot 60^2 \cdot 550 K_{CP2B}}{ku \cdot K_{X2B} \cdot \rho \cdot NPf^2 \cdot 5252.2 D^5}$$

where Kd is the derivative gain, B is a constant for causing pole-zero cancellation, Ap is a piston area of the actuator, J is the advance ratio, $K_{CP2B}$ is a rate of change of the power coefficient with respect to the pitch angle at the power coefficient and the advance ratio of the variable-pitch propeller, ku is a constant for units conversion, $K_{X2B}$ is a rate of change of an actuation position of the actuator with respect to the pitch angle at the current forward thrust condition, ρ is an ambient air density, NPf is the current rotational speed of the variable-pitch propeller, and D is an outer diameter of the variable-pitch propeller.

19. A power plant for propelling an aircraft, the power plant comprising:
- a variable-pitch propeller configured to propel the aircraft;
- an actuator for adjusting a pitch angle of blades of the variable-pitch propeller;
- a source of motive power configured to drive the variable-pitch propeller; and
- a propeller controller operatively connected to the variable-pitch propeller and configured to, when the variable-pitch propeller is operating in a current operating condition including a current rotational speed:
  - determine a speed error between the current rotational speed of the variable-pitch propeller and a set point rotational speed for the variable-pitch propeller;
  - determine a power coefficient of the variable-pitch propeller at the current operating condition;
  - determine an advance ratio of the variable-pitch propeller at the current operating condition;
  - determine a gain for a feedback control loop, the gain being scheduled based on the power coefficient of the variable-pitch propeller and the advance ratio of the variable-pitch propeller; and
  - use the feedback control loop to adjust the pitch angle of the blades of the variable-pitch propeller based on the speed error and using the gain to reduce the speed error.

20. The power plant as defined in claim 19, wherein:
- the actuator is a hydraulic actuator;
- the current operating condition of the variable-pitch propeller is a forward thrust condition;
- the gain is a proportional gain; and
- the propeller controller is configured to determine the proportional gain using:

$$Kp = \frac{-B \cdot Ap \cdot K_{CP2B} \left( \frac{2Cp}{NPf} - \frac{K_{NP2J} K_{J2B}}{K_{CP2B}} \right)}{ku \cdot K_{X2B}}$$

where Kp is the proportional gain, B is a constant for causing pole-zero cancellation, Ap is a piston area of the actuator, $K_{CP2B}$ is a rate of change of the power coefficient with respect to the pitch angle at the power coefficient and the advance ratio of the variable-pitch propeller, Cp is the power coefficient, NPf is the current rotational speed of the variable-pitch propeller, $K_{NP2J}$ is a rate of change of a propeller rotational speed with respect to the advance ratio at the current operating condition, $K_{J2B}$ is a rate of change of the advance ratio with respect to the pitch angle at the power coefficient and the advance ratio of the variable-pitch propeller, ku is a constant for units conversion, and $K_{X2B}$ is a rate of change of an actuation position of the actuator with respect to the pitch angle at the current operating condition;
- the feedback control loop is a proportional-derivative feedback control loop;
- the propeller controller is configured to determine a derivative gain using:

$$Kd = \frac{-B \cdot Ap \cdot J \cdot 60^2 \cdot 550 K_{CP2B}}{ku \cdot K_{X2B} \cdot \rho \cdot NPf^2 \cdot 5252.2 D^5}$$

where Kd is the derivative gain, J is the advance ratio, ρ is an ambient air density and D is an outer diameter of the variable-pitch propeller; and
- the propeller controller is configured to use the feedback control loop to adjust the pitch angle of the blades of the variable-pitch propeller based on the speed error using the proportional gain and the derivative gain to reduce the speed error.

* * * * *